March 21, 1967 WEI TEH CHOW 3,310,233
MOMENT-COMPENSATED COMPUTING SCALE
Filed June 22, 1964 5 Sheets-Sheet 1

INVENTOR
Wei Teh Chow

INVENTOR
Wei Teh Chow

March 21, 1967   WEI TEH CHOW   3,310,233
MOMENT-COMPENSATED COMPUTING SCALE
Filed June 22, 1964   5 Sheets-Sheet 4

INVENTOR
Wei Teh Chow

United States Patent Office 3,310,233
Patented Mar. 21, 1967

3,310,233
MOMENT-COMPENSATED COMPUTING SCALE
Wei Teh Chow, 2036 Union St., Brooklyn, N.Y. 11212
Filed June 22, 1964, Ser. No. 376,636
11 Claims. (Cl. 235—61)

This invention relates to computing scales and especially to a lever-type balance in which the difference in moments caused by the weight of the lever itself in relation to a variable fulcrum point is compensated for automatically.

In a scale in which it is desired to weigh an item and to have the scale indicate the unit weight price and total price of the item, the unit weight price is a variable multiplying factor, since scales ordinarily are used to weigh many types of commodities which have different unit weight prices, such as meat, cheese, fruit, etc. A lever and fulcrum can be used to provide different multiplying factors in terms of relative lever-arm-length ratios, by moving the fulcrum to different points along the length of the lever. In an ideal weightless lever, no difficulty is caused by shifting the position of the fulcrum point but in a practical lever, the weight of the lever bar itself acts to produce a turning moment when the fulcrum point is away from the exact center of the lever. This turning moment introduces an error in the multiplying factor. The present invention automatically compensates for the turning-moment error caused by the unbalanced weight of the lever arm, the unbalanced weight varying as the fulcrum point of the lever is moved away from the center of the lever.

The objects and advantages of this invention are accomplished by means of a compensating weight which is automatically moved along the length of the lever arm of a scale in proper relationship to the movement along the lever arm of the fulcrum point.

An object of this invention is to automatically compensate for the turning-moment error caused by the unbalanced weight of a lever arm, the unbalanced weight varying as the fulcrum point of the lever is moved away from the center of the lever.

Another object is to provide a computing scale which can weigh various items with different unit-weight prices and automatically indicate the total price of each item.

Other objects and many of the attendant advantages of this invention will be appreciated as the same becomes better understood by reference to the following detailed description when considered in connection with the accompanying drawings wherein.

Figure 1:
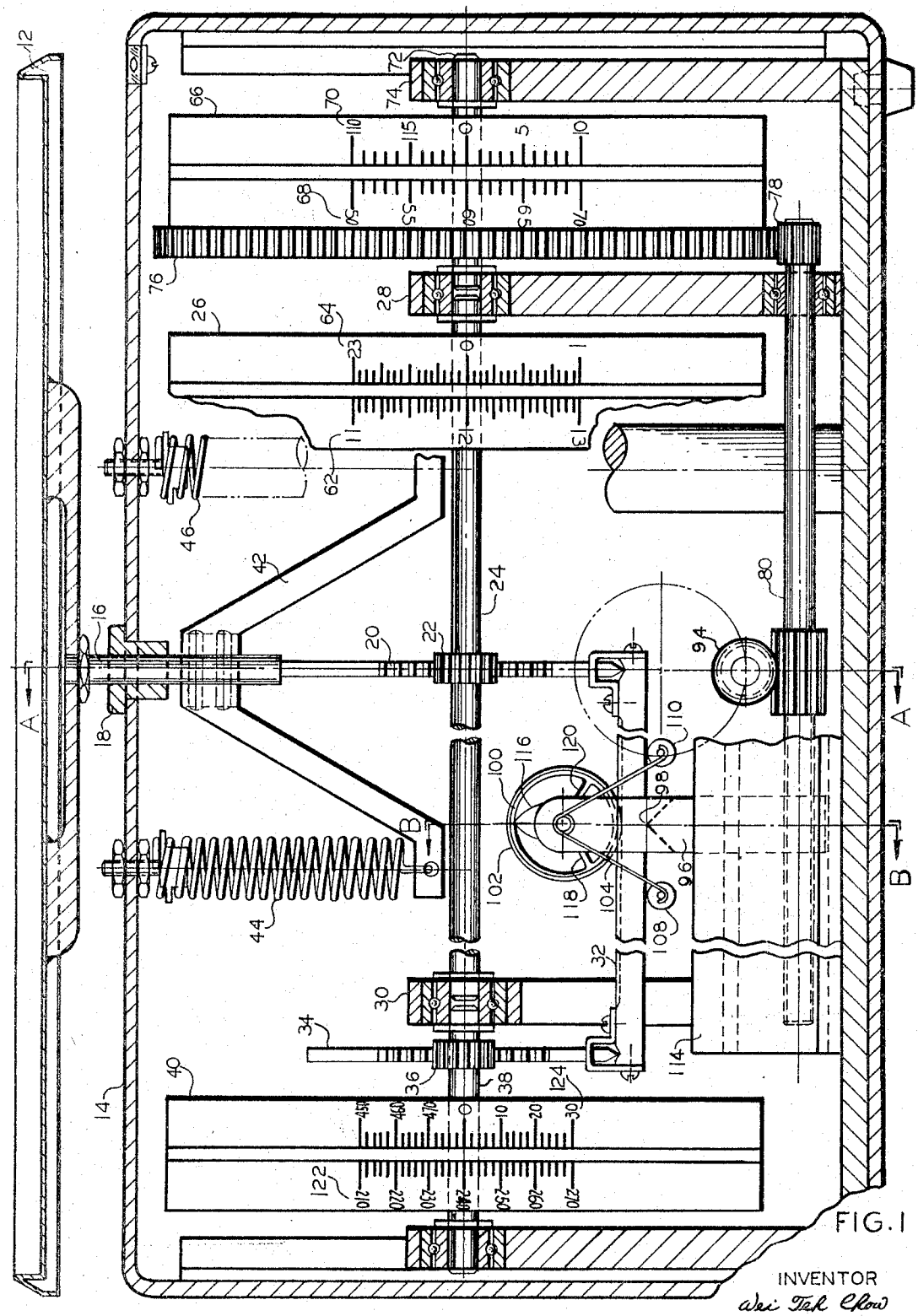
FIGURE 1 is a cross-sectional view of one embodiment of the invention.

In the cross-sectional view of an embodiment of the invention shown in FIG. 1, a load-receiving pan 12 is mounted above a housing 14 upon a pan-support rod 16.

The rod 16 is connected through a bushing 18 to a rack, which may be termed the pan rack 20. The pan rack 20 is coupled with the pan pinion 22 which is affixed to the weight-drum shaft 24 to which the weight drum 26 is affixed. The weight-drum shaft 24 is end-supported by supporting walls 28 and 30.

The lower end of the pan rack 20 bears upon one end of the compensated weight lever 32. A second rack, the total-drum rack 34, bears upon the other end of the compensated weight lever 32. The total-drum rack 34 is coupled with the total-drum pinion 36 which is affixed to the total-drum shaft 38 to which the total drum 40 is fastened.

A cross-arm 42 is also affixed to the pan support rod 16. This cross arm 42 has four segments, weighing springs 44 and 46 being affixed between two of the segments and the housing 14 by any convenient means. Absorbers 48 and 50 (see FIG. 2) are affixed between the ends of the other two segments of the cross arm 42 and the housing 14.

The pan rack 20 is held in position and guided by a rack guide 52 in the form of a flat circular disc which forms a flange 54 at the edge of a cylindrical shoulder 56, the shoulder and disc being concentric with each other. The rack guide 52 is held in place against the pan rack 20 by a springy guide-holding wire 58 which is anchored to a bracket 60 which, in turn, is mounted on the housing 14. The rack guide 52 prevents disengagement of the pan rack 20 and its pinion 22 and checks undesired sidewise movement of the compensated weight lever.

The same type of guiding set-up is employed in conjunction with the total-drum rack 34.

As stated before, a weight drum 26 is attached to the weight-drum shaft 24. Two calibrated scales 62 and 64 marked with an appropriate number of divisions and corresponding numbers are arranged on the drum 26 in opposite directions so that the weight can be read either from the front or from the rear of the weighing machine. This enables the customer as well as the seller to see the weight.

Figure 2:
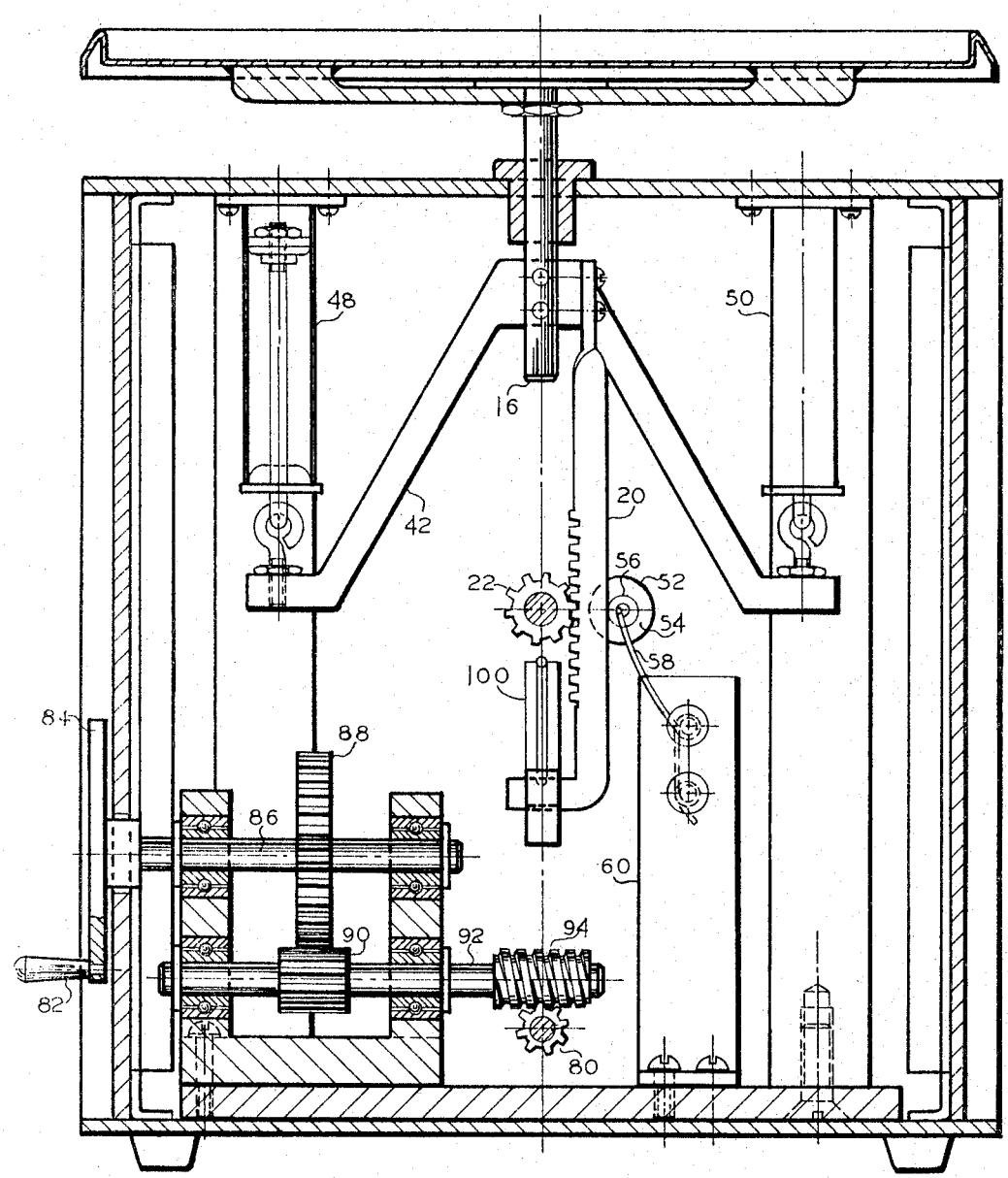
FIGURE 2 is a cross-sectional view of the embodiment shown in FIGURE 1 taken along the line A—A.

A price drum 66, also bearing two calibrated scales 68 and 70 arranged in opposite directions is affixed to a shaft 72 which is supported by supporting walls 28 and 74. The shaft 72 is geared to be rotated by a price-setting gear 76 which is coupled to the price-setting pinion 78. The latter is affixed to and rotated by the pivot-setting shaft 80. The pivot-setting shaft 80 is rotated by means of a handle 82 on a wheel 84 which is mechanically coupled to the shaft 80 through an arrangement of shafts and gears (viz., shaft 86, gear and pinion 88 and 90, shaft 92 and pinion 94) as shown in FIG. 2. The price per unit weight (e.g., price per pound) of the item to be weighed is thus set into the weighing machine by turning the handle 82 which rotates the price drum 66 to the proper setting. At the same time, the rotary motion of the price-setting shaft 80 is coupled by means of threading to the pivot block 96.

It should be noted that the divisions on any of the scales used in this invention are equally spaced—they are not widely spaced at one end of the scale and crowded at the other end with differing accuracy of measurement and difficulty of reading the scale at the crowded end.

Figure 3:
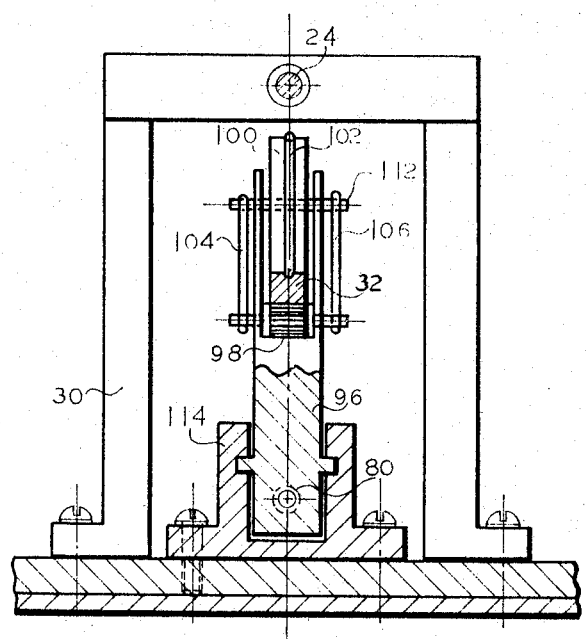
FIGURE 3 is a cross-sectional view of the embodiment shown in FIGURE 1 taken along the line B—B.

As can be seen in FIG. 3, the pivot block 96 is formed with a knife edge 98 which acts as a fulcrum support for the compensated weight lever 32. The pivot block 96 rotatably supports a moment-compensating member, in this case a compensation wheel 100 which has an encircling guiding band 102 of rubber or plastic. The guiding band 102 rides in a groove, or track, in the upper surface of the compensated weight lever 32. The wheel 100 rotates around a shaft 112 which is supported by the pivot block 96. The wheel 100 rotates as the pivot block 96 is moved to the left or right (as shown in FIG. 1) under the driving force of the pivot-setting shaft 80 with which it is threaded. The pivot block 96 is supported by and rides in the pivot guide block 114. Because of friction between the pivot block 96 and the pivot guide block 114, the pivot block tends to tilt. This is prevented by rollably tying the upper end of the guide block 96 to the compensated weight lever 32. The shaft 112 of the compensation wheel 100 is tied by means of tie wires 104 and 106 to the shafts which support spaced rollers 108 and 110 which run along the underside of the compensated weight lever 32.

The compensation wheel 100 can be moved almost the complete length of the compensated weight lever 32. Because of the screw-threaded coupling of the pivot block 96 with the pivot-setting shaft 80, very accurate setting of the fulcrum or knife edge 98 is possible.

For explanatory purposes, it will be assumed for the present that the upper half 116 of the compensation wheel 100 is solid whereas the lower half contains only a pair of spokes 118 and 120. The center of gravity of the wheel 100 is therefore somewhere in the upper half 116 along the vertical line which bisects the wheel.

In operation, the operator turns the handle 82 and sets the price-drum scales 68 and 70 to the proper amount. This operation also moves the pivot block 96 which moves the fulcrum 98 to a position such that the movement of the total-drum rack 34 in response to the movement of the pan rack 20 is sufficient to rotate the total-drum scales 122 and 124 to the proper setting which is the product of the settings of the weight drum 26 and the price drum 66. The movement of the fulcrum 98 acts to change the lever arm ratios to provide the proper multiplying factor between the magnitudes of the movements of the pan rack 20 and the total drum rack 34.

However, due to the fact that the compensated weight lever 32 is not an ideal weightless bar but is a practical bar, an error is introduced by the weight of the bar when the fulcrum point is shifted away from the center of the bar. If the bar is homogeneous and symmetrical, it will be in a condition of dead balance when the fulcrum point is at the center of the bar, i.e., the lever is balanced on the fulcrum by its own weight, or its own weight produces no unbalanced moment. From elementary mecanics, if the fulcrum 98 is in the center of the lever 32 (dotted wheel in FIG. 4), the formula representing the indicated conditions is (sum of the moments equals zero):

$$F_1D_1 - F_2D_2 = 0$$

where
$F_1$ is the force at the left side of the lever,
$F_2$ is the force at the right side of the lever,
$D_1$ is the distance from $F_1$ to the fulcrum point, and
$D_2$ is the distance from $F_2$ to the fulcrum point.

If the wheel 100 is rotated to the right (solid wheel in FIG. 4), the weight of the wheel and the weight of the lever bar must now be taken into account. If the bar is homogeneous and of equal cross-sectional area along its entire length, the weight $W_1$ of the section to the left of the fulcrum point will act as though it is concentrated at the middle of the left-hand section a distance $L_1$ from the fulcrum point; likewise the weight $W_2$ of the right-hand section of the bar acts as though it is concentrated at the middle of the right-hand section a distance $L_2$ from the fulcrum point. The center of gravity of the wheel is now a horizontal distance S from the fulcrum point. However, in determining the effect of the weight of the wheel, it may be seen that the only parts of the weight of the wheel which do not cancel each other out are the added weight of the pie-shaped wedge ABC on the right side of the fulcrum point and the subtracted weight of the equal pie-shaped wedge MBN on the left side of the fulcrum point. Effectively, this just amounts to adding twice the weight of the wedge ABC (which shall be designated the eccentric weight M hereinafter) on the right-hand side of the fulcrum point at a distance S. The formula for this condition is:

$$F_1'D_1' + W_1L_1 - F_2'D_2' - W_2L_2 - MS = 0$$

If $MS = W_1L_1 - W_2L_2$, the effect of the weight of the lever 32 is eliminated and the shifting of the fulcrum point can be accomplished without any error in the magnitude of the movement of the total-drum rack 34. The eccentric mass, or weight, is always the difference in weight between the two sections of the compensation wheel (or any compensation weight), the two sections being the parts to the left and the right of a vertical line passing through the compensation wheel (or weight) and the fulcrum point.

The difference $W_1L_1 - W_2L_2$ is a linear relation with distance along the length of the bar. The eccentric weight M changes linearly with distance along the lever 32 but the distance S of the center of gravity 122 of the wheel from the fulcrum point varies sinusoidally with the angle of rotation $\theta$ which, in turn, varies linearly with distance along the length of the bar. Therefore, S varies sinusoidally with distance along the length of the bar (from its midpoint) which may be designated by the letter $x$.

Figure 4:
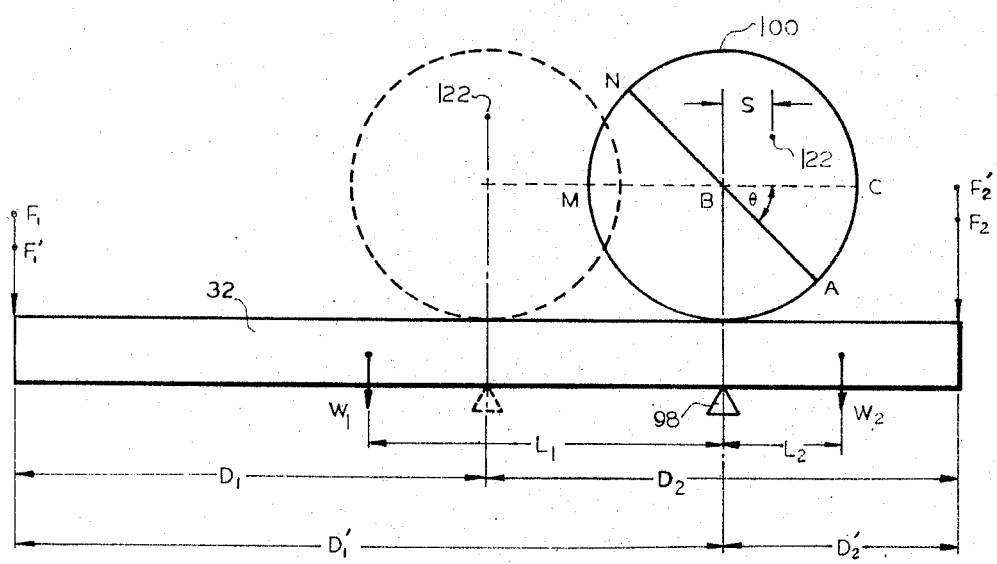
FIGURE 4 is a diagrammatic illustration of the rotation of the compensation wheel along the compensated weight lever.

If the weighted (upper half) portion of the compensation wheel 100 is symmetrical about a vertical line drawn through its center, as shown in the dotted wheel in FIG. 4, the eccentric mass M will be equal to twice the mass of the pie-shaped wedge ABC. But the mass is dependent on the area of the wedge which, in turn, is dependent on the angle of rotation $\theta$. Utilizing concepts of calculus, it can be said that the area A of the pie-shaped wedge is $$A = \int \tfrac{1}{2} R \, dl = \int \tfrac{1}{2} R(R\,d\theta) = \int \tfrac{1}{2} R^2 d\theta = \tfrac{1}{2} \int f(\theta) d\theta$$

$$A = k_1 \int f(\theta) d\theta \qquad (I)$$

where $dl$ is a differential amount of peripheral length, R is the radius of the wheel and $d\theta$ is a differential amount of the angle of rotation.

Now, it is desired that the product MS vary linearly with $\theta$. Therefore, let $$MS = k_2 \theta$$
$$M(k_3 \sin \theta) = k_2 \theta$$
$$M = k_4 (\theta / \sin \theta)$$

and since the eccentric weight M is proportional to the area A, $$A = k_5 M = k_6 \frac{\theta}{\sin \theta} \qquad (II)$$

where the symbol $k$ stands for a constant.

Since the Area A is proportion to M, it can be seen from a comparison of Equations I and II that $$\int f(\theta) d\theta = \frac{\theta}{\sin \theta}$$

$$f(\theta) = \frac{d}{d\theta}\left[\frac{\theta}{\sin \theta}\right]$$

$$f(\theta) = \frac{1}{\sin \theta} - \frac{\theta \cos \theta}{\sin^2 \theta} \qquad (III)$$

Figure 5:
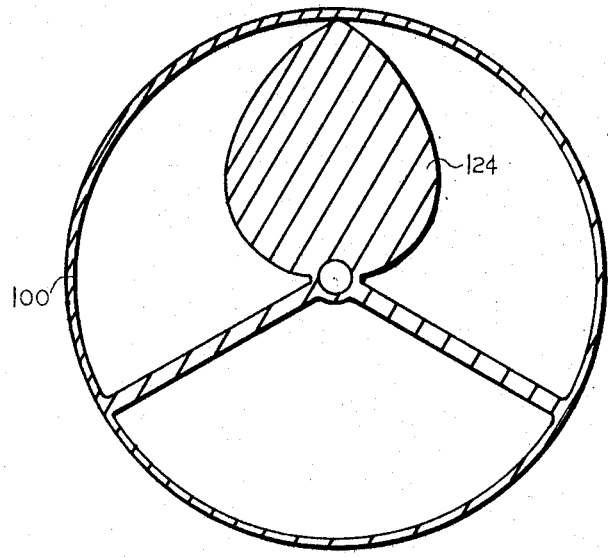
FIGURE 5 is a cross-sectional view of the compensation wheel, especially illustrating the shape of the weighted portion thereof.

Thus, if $R^2$ varies with $\theta$ in the first quadrant of the wheel in a manner given by the right-hand side of Equation III and the second quadrant is a mirror image of the first quadrant, the product MS will vary linearly with $\theta$. The weighted portion of the wheels is then shaped according to this equation and will look substantially like the portion 124 shown in FIG. 5. After finding the distance S of the center of gravity from the center of the wheel, the total eccentric mass M can be determined from the formula $M = WL/S$, where W is the total weight of the bar and L is the length of the entire bar. This assumes that the wheel 100 turns exactly 90 degrees between the center of the lever 32 and each end of the lever.

The actual weight of the weighted portion 124 of the wheel equals one-half the eccentric mass M. (It is assummed that the weight of the rest of the wheel is negligible in comparison to the weight of the weighted portion 124.)

Figure 6:
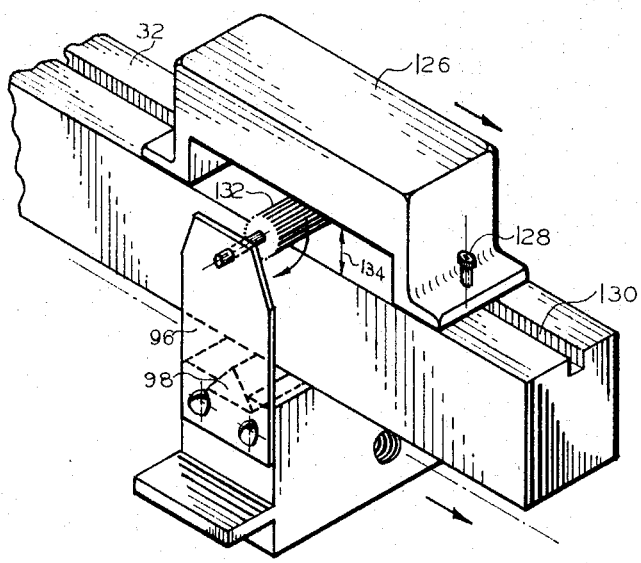
FIGURE 6 is an isometric view of a preferred embodiment of a compensation weight and a mechanism which can be used to move the weight.

A preferred embodiment of the moment-, or weight-, compensating mechanism is shown in FIG. 6. Here the compensating member is a roughly rectangular compensation block 126. A screw 128 on each side of the block 126 extends down into a slot 130 which runs along the entire length of the compensated weight lever 32. The screws act as sliding guides for the block 126 and also as supports for the block. The screws are adjusted to hit the bottom of the slot 130 when the compensation block 126 rests on top of the roller 132, which may be fabricated from rubber or nylon, for example. The height 134 of the excised portion of the block is made slightly larger than the diameter of the roller 132 so that the lower surfaces of the block just clear the upper surfaces of the lever 32.

The block 126 is initially set up so that the knife edge 98, the center of the roller 132 and the center of the block 126 are in the same vertical line as the center of the compensated weight lever 32. As the pivot block 96 is moved to the right, the roller rotates and moves the block 126 to the right.

Figure 7:
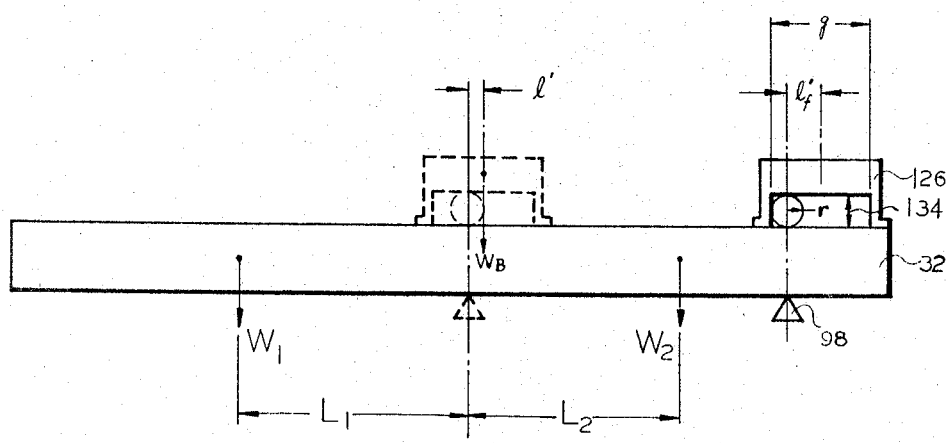
FIGURE 7 is a diagrammatic illustration of movement of the compensation weight of FIGURE 6 along the compensated weight lever.

In this case, if the block 126 is moved some distance to the right, as shown by the dotted lines in FIG. 7, the difference in the moments due to the weight of the bar 32 must be compensated by the moment due to the center of gravity of the weight $W_B$ of the block 126 acting at a distance $l'$ from the fulcrum point. The relation is $$W_1L_1 - W_2L_2 = W_B l'$$

At the final position of the block, the roller and the left side of the block are in contact as shown by the solid-line block and roller. The diameter of the roller is made such that if $n$ is some integral number, the following relation holds: $l_t' = n(2\pi r)$. The length of the excised portion of the block must be $g = 2l_t' + 2r$. The weight of the block can then be found from the formula $$W_B = \frac{W_1 L_1 - W_2 L_2}{l_t'}$$

where $W_1$, $W_2$, $L_1$ and $L_2$ are the weights and distances when the fulcrum point is as shown by the solid lines in FIG. 7 (compensation block at end of compensated lever).

It may be desired to pinion the periphery of the roller 132 and to construct the top surface of the compensated lever 32 and the roller-contacting surface of the block 126 as racks.

Figure 8:
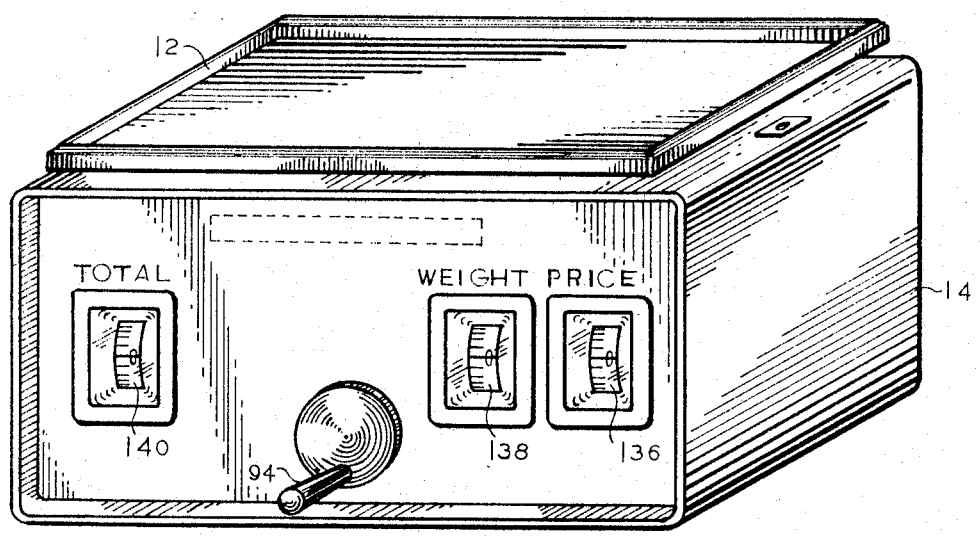
FIGURE 8 is a pictorial view of the outside of the computing scale.

The outside of the computing scale is shown in FIG. 8. The price-drum, weight-drum and total-drum scales, 70, 64 and 124 respectively, can be viewed by the weigher through windows 136, 138 and 140 on the front. There are similar windows at the rear for the purchaser to view the reversed scales 68, 64 and 122. Thus, the scale weighs an item, shows its price per unit weight and its weight, and automatically computes and shows the total price of the item.

It should be noted that the computing scale is actually a multiplying machine. The multiplicand is the weight of any object placed on the load-receiving pan; the position of the fulcrum introduces a multiplying factor which can be read on the price-drum scale; and the product is the force exerted on the total-drum rack, the value being indicated by the total-drum scale. The units of these items may, or may not be, weight and price units.

Obviously, variations of the present invention are possible in the light of the above teachings. It is therefore to be understood that within the scope of the appended claims, the invention may be practiced otherwise than as specifically described.

I claim:

1. A device automatically compensating for the moment produced by the unbalanced weight of a lever when the fulcrum point is moved away from the center of the lever comprising, in combination:

a lever;

a fulcrum movable along the length of said lever;

a moment-compensating member slidably movable along the upper surface of said lever; and means for moving said member along said lever, said means comprising a roller having a shaft which is coupled to move with said fulcrum, said roller rotating along the length of said lever as said fulcrum moves along the lever, said member comprising a roughly rectangular block having a rectangular excised portion extending substantially the length of the lower section of said block, the height of said excised portion being slightly greater than the diameter of said roller, said block being placed upon said roller so that said roller may move within said excised portion, said block and said excised portion being symmetrical about a transverse plane through the center thereof, said block being placed upon said roller so that the center line of said block is aligned with the center of said lever when the fulcrum point is at the center of said lever, the weight of said block being calculated from the formula $$W_B = \frac{W_1 L_1 - W_2 L_2}{l_t'}$$

where $W_1$ is the weight of the portion of the lever which lies on the left of the fulcrum point, $W_2$ is the weight of the portion of the lever which lies on the right of the fulcrum point, $L_1$ is the distance between the fulcrum point and the center of the portion of the lever to the left of the fulcrum point, $L_2$ is the distance between the fulcrum point and the center of the portion of the lever to the right of the fulcrum point, and $l_t'$ is the distance between the fulcrum point and the center of said block.

2. A device automatically compensating for the moment produced by the unbalanced weight of a lever when the fulcrum point is moved away from the center of the lever comprising, in combination:

a lever;

a fulcrum movable along the length of said lever;

a moment-compensating member movable along the upper surface of said lever; and means for rotatably moving said member along said lever, the movement of said member being coupled to that of said fulcrum so that the center of said member always lies on the line passing through the fulcrum point normal to the axis of said lever, said moment-compensating member being shaped like a wheel with a weighted portion extending from the center to the periphery thereof, the shape of said weighted portion being calculated from the formula $$R^2 = \frac{1}{\sin \theta} - \frac{\theta \cos \theta}{\sin^2 \theta}$$

where $R$ is the radius of said wheel and $\theta$ is the angle of rotation of said wheel, the radius of said wheel being of such magnitude that ninety degrees of rotation of said wheel occurs between the center and each end of said lever, said weighted portion being symmetrically distributed in the first and second quadrants of said wheel when the center of said wheel is exactly aligned with the center of said lever, the weight of said wheel being substantially that of the weighted portion and calculated from the formula $$MS = W_1 L_1 - W_2 L_2$$

where $M$ is the eccentric weight of said wheel, $S$ is the distance of the center of gravity of said wheel from the fulcrum point, $W_1$ is the weight of the portion of the lever which lies on the left of the fulcrum point, $W_2$ is the weight of the portion of the lever which lies on the right of the fulcrum point, $L_1$ is the distance between the fulcrum point and the center of the portion of the lever to the left of the fulcrum point, and $L_2$ is the distance between the fulcrum point and the center of the portion of the lever to the right of the fulcrum point.

3. A computing scale for weighing items having different prices per unit weight and for calculating the total prices thereof comprising, in combination:

a compensation device comprising a lever, a fulcrum movable along the length of said lever, a moment-compensating member movable along the upper surface of said lever, and means for moving said member along said lever, the movement of said member being coupled to that of said fulcrum, said member being constructed with its center of gravity in the same plane as the fulcrum point when the fulcrum point is at the exact center of said lever, the distance of the center of gravity from the fulcrum point increasing as the fulcrum moves toward either end of said lever, the moment produced by said member being equal and opposite at all points along the lever to the moment produced by the unbalanced weight of said lever;

weight-receiving means;

a first rod affixed at one end to said weight-receiving means and extending vertically downward therefrom, the other end of said rod bearing upon one end of said lever, said rod being formed with a first rack thereon;

a second rod vertically bearing at one end upon the other end of said lever, said second rod being formed with a second rack thereon;

resilient means coupled to said first rod and opposing the movement of said first rod in response to a weight applied to said weight-receiving means;

weight-scale means comprising first graduated scale means, a first shaft to which said first graduated scale means is attached and a first pinion which is affixed to said shaft and coupled to said rack on said first rod;

price-scale means comprising second graduated scale means, a second shaft to which said second graduated scale means is attached, and gearing for rotating said second shaft;

screw means for moving said fulcrum along the length of said lever including a third shaft one end of which is screw-threaded to move said fulcrum and the other end of which is coupled to said gearing of said price-scale means, for rotating its shaft; and total-scale means comprising third graduated scale means, a fourth shaft to which said third graduated scale means is attached, and a second pinion affixed to said fourth shaft and coupled to said rack on said second rod, said third graduated scale means showing the total price of an item in the weight-receiving means which is the product of the values shown by the graduated scale means of said weight-scale means and said price-scale means.

4. A computing scale as described in claim 3, wherein said graduated scale means of said weight-scale means, said price-scale means and said total scale means each include two graduated scales, one arranged in the opposite direction from its associate so that one can be read from the front of the computing scale and the other can be read from the rear of the scale.

5. A computing scale for weighing items having different prices per unit weight and for calculating the total prices thereof comprising, in combination:

a compensation device comprising a lever, a fulcrum movable along the length of said lever, a moment-compensating member slidably movable along the upper surface of said lever, and means for moving said member along said lever, said means comprising a roller having a shaft which is coupled to move with said fulcrum, said roller rotating along the length of said lever as said fulcrum moves along the lever, said member comprising a roughly rectangular block having a rectangular excised portion extending substantially the length of the lower section of said block, the height of said excised portion being slightly greater than the diameter of said roller, said block being placed upon said roller so that said roller may move within said excised portion, said block and said excised portion being symmetrical about a transverse plane through the center thereof, said block being placed upon said roller so that the center line of said block is aligned with the center of said lever when the fulcrum point is at the center of said lever, the weight of said block being calculated from the formula $$W_B = \frac{W_1 L_1 - W_2 L_2}{l_f^1}$$

where $W_1$ is the weight of the portion of the lever which lies on the left of the fulcrum point, $W_2$ is the weight of the portion of the lever which lies on the right of the fulcrum point, $L_1$ is the distance between the fulcrum point and the center of the portion of the lever to the left of the fulcrum point, $L_2$ is the distance between the fulcrum point and the center of the portion of the lever to the right of the fulcrum point, and $l_f^1$ is the distance between the fulcrum point and the center of said block;

weight-receiving means;

a first rod affixed at one end to said weight-receiving means and extending vertically downward therefrom, the other end of said rod bearing upon one end of said lever, said rod being formed with a first rack thereon;

a second rod vertically bearing at one end upon the other end of said lever, said second rod being formed with a second rack thereon;

resilient means coupled to said first rod and opposing the movement of said first rod in response to a weight applied to said weight-receiving means;

weight-scale means comprising first graduated scale means, a first shaft to which said first graduated scale means is attached and a first pinion which is affixed to said first shaft and coupled to said rack on said first rod;

price-scale means comprising second graduated scale means, a second shaft to which said second graduated scale means is attached, and gearing for rotating said second shaft;

screw means for moving said fulcrum along the length of said lever including a third shaft one end of which is screw-threaded to move said fulcrum and the other end of which is coupled to said gearing of said price-scale means for rotating its shaft; and total-scale means comprising third graduated scale means, a fourth shaft to which said third graduated scale means is attached, and a second pinion affixed to said fourth shaft and coupled to said rack on said second rod, said third graduated scale means showing the total price of an item in the weight-receiving means which is the product of the values shown by the graduated scale means of said weight-scale means and said price-scale means.

6. A multiplying scale comprising, in combination:

weighing means including weight-receiving means and means for indicating the weight of an object placed on said weight-receiving means;

multiplying-factor means for indicating the value of a factor by which the weight of the object is to be multiplied;

product-indicating means for indicating the value of the product resulting from the multiplication of said weight and said multiplying factor;

lever means including a lever, said lever means being coupled to said weight-receiving means and said product-indicating means, the actuating force on one side of said lever being proportional to the weight of the object placed on said weight-receiving means and the consequent force exerted by the other side of said lever being the force actuating said product-indicating means, said lever means including a movable fulcrum and fulcrum-moving means coupled with said fulcrum and said multiplying-factor means, said fulcrum-moving means being arranged to move the fulcrum point along said lever in correspondence with the setting of said multiplying-factor means; and moment-compensating means including a moment-compensating member movable along a surface of said lever in correspondence with the movement of said fulcrum whereby the moment produced by the unbalanced weight of said lever when said fulcrum is moved is balanced out by an equal and opposite moment due to the unbalanced weight of said moment-compensating member.

7. A device as set forth in claim 6, further including moving means for moving said moment-compensating member, said moving means comprising a roller having a shaft which is coupled to move with said fulcrum, said roller rotating along the length of said lever as said fulcrum moves along said lever, said moment-compensating member comprising a roughly rectangular block having a rectangular excised portion extending substantially the length of the lower section of said block, the height of said excised portion being slightly greater than the diameter of said roller, said block being placed upon said roller so that said roller may move within said excised portion, said block and said excised portion being symmetrical about a transverse plane through the center thereof, said block being placed upon said roller so that the center line of said block is aligned with the center of said lever when the fulcrum point is at the center of said lever.

8. A device as set forth in claim 7, wherein the weight of said block is calculated from the formula $$W_B = \frac{W_1 L_1 - W_2 L_2}{l_t^1}$$

where $W_1$ is the weight of the portion of the lever which lies on the left of the fulcrum point, $W_2$ is the weight of the portion of the lever which lies on the right of the fulcrum point, $L_1$ is the distance between the fulcrum point and the center of the portion of the lever to the left of the fulcrum point, $L_2$ is the distance between the fulcrum point and the center of the portion of the lever to the right of the fulcrum point, and $l_t^1$ is the distance between the fulcrum point and the center of said block.

9. A computing scale comprising, in combination:

weighing means including weight-receiving means and means for indicating the weight of an object placed on said weight-receiving means;

unit-price indicating means for indicating the price per unit weight of an object to be weighed;

total-price indicating means for indicating the total price of an object placed on said weight-receiving means;

lever means including a lever coupled to said weight-receiving means and said total-price indicating means, the actuating force on one side of said lever being proportional to the weight of the object placed on said weight-receiving means and the consequent force exerted by the other side of said lever being the force actuating said total-price indicating means, said lever means including a movable fulcrum and fulcrum-moving means coupled with said fulcrum and said unit-price indicating means, said fulcrum-moving means arranged to move the fulcrum point along said lever in correspondence with the price-per-unit-weight setting of said unit-price indicating means; and moment-compensating means including a moment-compensating member movable along a surface of said lever in correspondence with the movement of said fulcrum point whereby the moment produced by the unbalanced weight of said lever when said fulcrum is moved is balanced out by an equal and opposite moment due to the unbalanced weight of said moment-compensating member.

10. A device as set forth in claim 9, further including moving means for moving said moment-compensating member, said moving means comprising a roller having a shaft which is coupled to move with said fulcrum, said roller rotating along the length of said lever as said fulcrum moves along said lever, said moment-compensating member comprising a roughly rectangular block having a rectangular excised portion extending substantially the length of the lower section of said block, the height of said excised portion being slightly greater than the diameter of said roller, said block being placed upon said roller so that said roller may move within said excised portion, said block and said excised portion being symmetrical about a transverse plane through the center thereof, said block being placed upon said roller so that the center line of said block is aligned with the center of said lever when the fulcrum point is at the center of said lever.

11. A device as set forth in claim 10, wherein the weight of said block is calculated from the formula $$W_B = \frac{W_1 L_1 - W_2 L_2}{l_t^1}$$

where $W_1$ is the weight of the portion of the lever which lies on the left of the fulcrum point, $W_2$ is the weight of the portion of the lever which lies on the right of the fulcrum point, $L_1$ is the distance between the fulcrum point and the center of the portion of the lever to the left of the fulcrum point, $L_2$ is the distance between the fulcrum point and the center of the portion of the lever to the right of the fulcrum point, and $l_t^1$ is the distance between the fulcrum point and the center of said block.

References Cited by the Examiner

UNITED STATES PATENTS

| 1,623,134 | 4/1927 | Rouleau | 177—31 |
| 1,793,276 | 2/1931 | Chott | 177—25 |
| 2,410,138 | 10/1946 | Werner | 177—25 |

RICHARD B. WILKINSON, *Primary Examiner.*

W. F. BAUER, L. R. FRANKLIN, *Assistant Examiners.*